Figure 1:

J. M. LYNCH.
METHOD OF MAKING DIES.
APPLICATION FILED DEC. 7, 1908.

922,926.

Patented May 25, 1909.

WITNESSES
H. Dorsey Spencer
Emile H. Tardwell

INVENTOR
John M. Lynch

UNITED STATES PATENT OFFICE.

JOHN M. LYNCH, OF BEVERLY, MASSACHUSETTS, ASSIGNOR TO UNITED SHOE MACHINERY COMPANY, OF PATERSON, NEW JERSEY, A CORPORATION OF NEW JERSEY.

METHOD OF MAKING DIES.

No. 922,926.          Specification of Letters Patent.          Patented May 25, 1909.

Application filed December 7, 1908. Serial No. 466,412.

*To all whom it may concern:*

Be it known that I, JOHN M. LYNCH, a citizen of the United States, residing at Beverly, in the county of Essex and Commonwealth of Massachusetts, have invented certain Improvements in Methods of Making Dies, of which the following description, in connection with the accompanying drawings, is a specification, like reference characters on the drawings indicating like parts in the several figures.

This invention relates to methods of making dies and particularly to methods of making dies for use in dying out the parts of uppers of boots and shoes.

Dies of the type particularly intended to be made by the method of this invention have recently come into use in connection with the die cutting presses of the type known as "clicking machines." The clicking machine owes its designation principally to the fact that it performs quickly and easily work which has been performed until recently by hand by an operator sometimes called a "clicker."

Die cutting presses have long been used for dying out the soles of boots and shoes and for dying out heel lifts, but only recently has a successful machine been devised for die cutting the uppers of boots and shoes. Among the many obstacles to be surmounted in devising a successful upper cutting machine have been the necessity for providing a machine in which the operator could inspect the stock as the ordinary cutter or clicker does in order that it might be cut up to the best advantage and to provide a stock cutting die suitable for use with such a machine. It is not only important that the machine be so constructed that the material may be exposed as much as possible during the die placing operation but it is also important that the die itself be so constructed as also to expose the material as much as possible. Another obstacle in the way of the production and general adoption of a successful machine for dying out uppers for boots and shoes has been not only the initial cost of the set of dies necessary to produce the different styles and sizes of uppers manufactured in a single factory, but also the cost of replacing or remodeling these dies when the styles have changed.

In dying out uppers, a quite different problem is met with from that which confronts the manufacturer in dying out soles or heel lifts. Inasmuch as any inaccuracies in the shape of the soles or the heel lifts are corrected in the final trimming operations, it is not so important that soles and lifts be cut exactly to pattern in the first instance. In dying out uppers, however, it is important that the blank be cut exactly to pattern in the first instance. Furthermore the outlines of the sole and lift dies are comparatively simple and little difficulty is therefore experienced in approximating the desired pattern. On the other hand the outlines of the upper dies are frequently quite complicated and several different dies are required for each upper, one die being usually required for each part. Difficulty has therefore been experienced in shaping the die material into the exact outline of the desired pattern to be cut by any method which would permit the manufacture of the dies required for a factory at a reasonable cost.

The principal obstacles to the successful dying out of uppers have been overcome by the machine above referred to, known as the clicking machine. This machine, in its present commercial form, comprises a stock supporting bed, a die freely movable over said bed and a presser arm also movable over said bed into and out of operative relation to said die. To permit the ready inspection of the stock the die is formed open within its outline and quite shallow. To avoid marring or scratching the stock the die is preferably made comparatively light. In the operation of this machine it is important that the blank be entirely cut from the stock with one die cutting stroke of the presser arm and yet that the die be not driven so far into the cutting block that this block will be quickly roughened. In order that all parts of the edge of the cutting die may be driven through the stock simultaneously and that no part of it may be driven too far it is practically essential that all parts of the said edge lie in one plane and that the die be driven through the stock in a direction substantially perpendicular both to this plane and to the plane of the face of the cutting block. It will therefore be seen that when the die cutting pressure is exerted upon the upper edge of the die it is practically essential not only that the presser arm or member exert pressure throughout all parts of said edge or equally around the entire outline of the die, but that the upper surface of the die lie in a plane substantially parallel to the plane of the cutting edge. Although these dies when used with a machine constructed like that hereinabove described are not called upon to perform very heavy work and are therefore not quickly dulled, it is nevertheless desirable that provision be made for convenient sharpening of the dies in such manner that the cutting edge of the die will maintain its original outline. The cutting edge is, therefore, preferably made to lie in the inner surface of the die.

The skins from which uppers are formed are cut up one at a time in order that the parts of the skin best suited to particular parts of the upper may be used and that the skin may be cut up to the best advantage so far as the number and sizes of the pieces are concerned and, therefore, blanks for different sized uppers are frequently cut from the same skin. For convenience in assorting these blanks they are preferably marked during the cutting operation, and for this purpose the dies are preferably provided with means for making upon the blanks any suitable mark of identification, for example a mark indicating the size of the upper for which the blank is intended.

Given a machine like that hereinabove described and an equipment of dies having the desirable characteristics hereinabove enumerated, there is no question but that the cutting of the parts of uppers of boots and shoes by machinery has many advantages, both as to quantity of work and quality of work, over hand cutting. It is important, however, for the commercial success of these machines that the dies be manufactured as cheaply as possible with due regard to durability and accuracy, since, as above suggested, separate dies being required for each size of shoe and for each style, an equipment for a factory requires a large number of dies and changes in styles of shoes necessitate the purchase of new dies. It is therefore important that a method of making dies of the general type above referred to be devised by which such dies can be produced by comparatively unskilled labor and at a small cost and a general object of the present invention is such a method.

A particular object of the present invention is a method of making dies of the type above referred to having the characteristics above enumerated by which such dies may be made and put upon the market at a cost which will make their use in machines for cutting out uppers practicable and desirable with due regard to the frequent changes in styles and the varieties of styles in use by different manufacturers.

It will readily be seen that a method of producing dies which will permit the general use of the above-mentioned clicking machine with its attendant advantages of increased quantity and superior quality with the same number and class of workmen will meet a long-felt want in the art of shoe manufacture. To this end the novel method which constitutes the subject-matter of this application has been devised and by this method upper cutting dies true to pattern and so constructed as to permit their successful employment in machines of the type above described can be made in a great variety of styles and sizes at comparatively small cost. This method comprises, in one of its important aspects, the production of a die having the general desirable characteristics above enumerated by bending approximately to the outline of the pattern to be cut by said die material somewhat longer than said outline and then butt-welding together the ends of said material and at the same time reducing the blank or die so produced to pattern. To insure uniform results with these dies it is important that the die cutting movement in the machines be uniform and it is therefore further important that the dies be of uniform height and that their upper and lower edges lie in substantially parallel planes.

An important feature of the invention therefore comprises a step, or steps, in the die making method which consists in bringing the upper and lower edges into parallel planes and another step which may conveniently coincide with the preceding step or steps and which consists in reducing to uniform height the dies of varying heights.

Other important features of the novel method of this invention will be apparent from a consideration of the following description illustrating the preferred manner of practicing the method of this invention.

Figure 2:
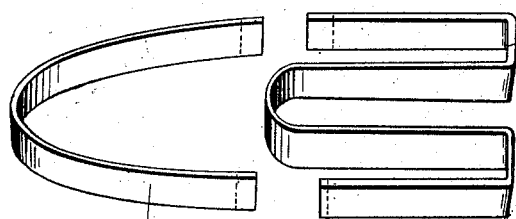
Figure 4:
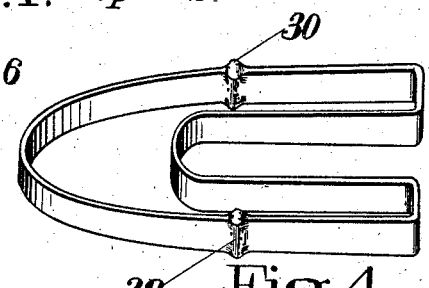
Figure 7:
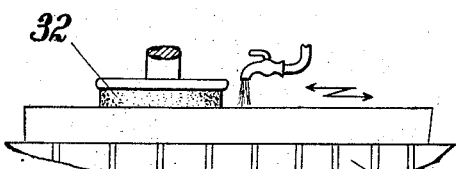
Figure 8:
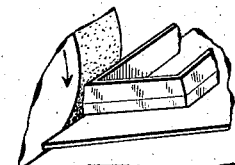
Figures 5, 9:
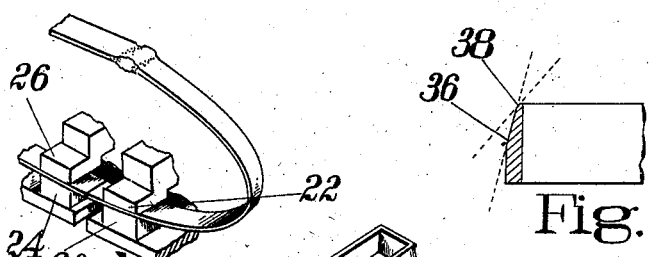
Figure 6:
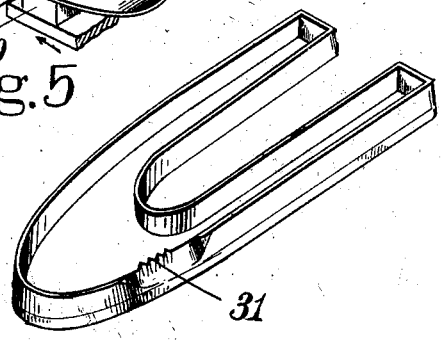
Figure 3:
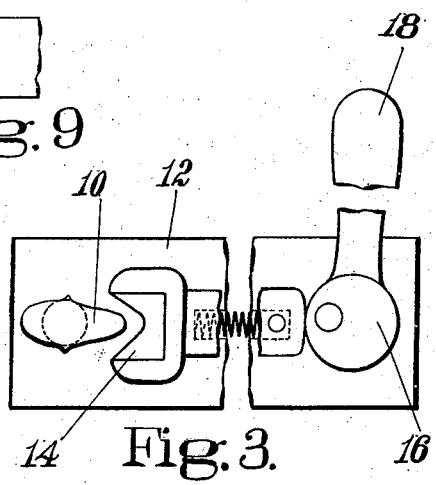

In the accompanying drawings,—Figure 1 shows in extension and in section strips of the die material from which the parts of a die such as that shown in Fig. 4 may be formed. Fig. 2 shows these strips bent into the outlines of the two parts to be welded together to form the vamp die shown in Figs. 4 and 6. Fig. 3 shows convenient device for bending the die strips. Fig. 4 shows the die parts butt welded together before the burs are removed. Fig. 5 illustrates the butt welding operation. Fig. 6 shows the die with the welding burs removed and nicks pressed into a portion of its cutting edge. Fig. 7 illustrates the final step in the operation of bringing the upper and lower edges of the die into parallel planes. Fig. 8 illustrates the preliminary beveling operation, and Fig. 9 is a section showing the two bevels by which the material of the die is brought down to a cutting edge.

In forming these dies a templet is first provided having the outline of the blank to be cut by the die and therefore the desired outline of the cutting edge of the die. The pattern from which the templet is formed is usually furnished by the shoe manufacturer, each manufacturer having his individual styles. The templet having been formed, the length of its outline is determined and a piece of die material is taken having a length somewhat greater than this outline. If the die is a large die having a more or less complicated outline such for example as the vamp die shown in Figs. 4 and 6, it is preferably made of two or more parts welded together. In determining the respective lengths of these parts the workman will divide the outline of the pattern with a view to diminishing the difficulties of forming the curves and corners in the die, apportioning the curves and corners among the parts so as to facilitate the shaping of the several die sections, and taking care also to have the free ends of the sections to be welded together located in such parts of the outline of the die as to facilitate reducing to pattern and maintaining the cutting edges in alinement during the welding operation. In this case the aggregate length of the two pieces of die material which are to form the two parts of the die is somewhat greater than the length of the outline of the templet. The excess of material in the two pieces is provided primarily for welding purposes. In addition to the excess of material provided for welding purposes it is desirable to provide a further excess to allow leeway for bending and also to compensate for any inaccuracies in bending. The excess required for welding is only about ¼ of an inch upon each end of each part of a two-part die. To allow for the inaccuracies of bending a further excess of about ½ inch in length is added to each piece of material which is to go into the die. This makes a total of approximately two inches excess material used in forming an ordinary vamp die. After the material has been cut to the desired length it is heated in those portions which it is desired to bend and then is bent to the outline of the templet, this bending being performed in a step by step manner by any suitable means, such, for example, as the bending table shown in Fig. 3 which comprises an interchangeable anvil 10 set in the table 12, and a former or bender 14 operated by an eccentric 16 to which is attached the handle 18. After the bending operation the parts of the die are laid upon the templet, or vice versa, and the two ends of each part are marked in such manner that each end will be provided, after the material beyond the mark has been severed, with about ¼ of an inch of excess material for welding. In cutting off the ends a clean contact surface is provided on each end for the butt welding operation. In Fig. 1 the strips of die material from which the two vamp die parts, shown at 6 and 8 in Fig. 2, are formed are indicated at 2 and 4. After the excess of material upon each of the ends of the two parts shown in Fig. 2 has been reduced to the amount desired for welding, the outside surfaces adjacent the ends are polished to provide good electrical contact and the ends are then butt welded together in any suitable electrical welding device, the two ends being forced together during the welding operation so that the excess of length of the die material is taken up and the completed die is reduced to pattern.

The welding operation is illustrated in Fig. 5, the two ends to be welded being clamped between clamp members 20, 22, 24, 26, the clamp members 20 and 24 constituting electrical contacts. During the welding operation the two pairs of clamp members 20 and 22, 24 and 26 are moved relatively to each other whereby the ends to be welded together are squeezed together and the heated excess material is forced out at each side, forming a bur such as that shown at 28 or 30 in Fig. 4. After the welding operation the burs are removed, the order of steps being preferably as follows: First the bur upon the outside of the die and upon the upper and lower edges is removed in any convenient manner as by grinding, then the die is put into a furnace and heated after which it is placed in a press and pressed in order to bring its upper and lower edges into substantially parallel planes. After the straightening operation the burs upon the inside of the die are removed in any suitable manner as for example by chipping and filing. This heating operation serves to remove any strains which may have been left in the die as the result of the bending or welding operations.

The pressing operation serves to bring the upper and lower edges of the die into substantially parallel planes but it is important, as hereinabove suggested, that the said edges be brought exactly into parallel planes. For this purpose the following steps are performed: The cutting edge is first brought into one plane in any suitable manner, as for example, by so-called Gardner grinding upon the side of a rotating grinding disk. If the cutting edge is to be provided with nicks, for example size indicating nicks, the outer surface of the die where the nicks are to be formed is ground down until the edge is of approximately the thickness desired for the final sharpening operations, and the nicks are then pressed into the edge as shown at 31 in Fig. 6. As this nicking operation is likely to throw some portions of the cutting edge out of the plane produced by the Gardner grinding operation above referred to, the die is preferably again Gardner ground after the nicking operation. The upper surface of the die is now brought into a plane parallel to the plane of the cutting edge and this operation may be performed conveniently upon several dies at once, the dies being reduced at the same time by removal of material from their upper edges to uniform height. In Fig. 7 is illustrated a convenient means for performing this operation, the illustrated means comprising a horizontal grinding disk 32 and a magnetic chuck 34 reciprocating below said disk, the dies placed upon said chuck with their cutting edges in contact with its upper face. After the dies are reduced to uniform height and their upper and lower edges have been brought into parallel planes, two bevels are provided upon the outside in order to sharpen the cutting edge, the first bevel 36 being at a slight angle to the outer surface of the die and comparatively long and the second bevel 38 being of a more abrupt inclination and comparatively short. The first bevel 36 is preferably formed by grinding the outside of the die as shown in Fig. 8 those parts of the surface which cannot be reached by the grinder being beveled preferably by filing. The second bevel 38, the formation of which constitutes the final sharpening operation is preferably formed by filing. This latter bevel gives to the die a chisel cutting edge and prevents its being driven easily into the block. It also permits sharpening the die with less danger of having different portions of the cutting edge in different planes.

Inasmuch as the outline of the blank to be cut is determined by the cutting edge of the die and this lies when sharpened in the inner surface of the die, it is important that the outline of this inner surface correspond exactly to the outline of the templet before the final sharpening operation and preferably before the initial beveling operation. An intermediate step therefore in the formation of these dies comprises fitting to the templet. This step is preferably performed after the operation of bringing the cutting edge into one plane by Gardner grinding said edge. The fitting to templet may be accomplished in any convenient manner, as for example by filing the inner surface to remove any irregularities in its outline. If the die is found to be short at this time it is lengthened out.

After the final sharpening operation the dies are tempered, polished and heated and provided with any accessories with which it may be desired to equip them, such for example as stamps, stab points, or other indicating devices. After the tempering operation it is sometimes necessary to again fit the die to the templet and this fitting is preferably accomplished without heating the die by simply springing or bending any parts which are out of the desired outline into said outline.

By the method hereinabove described an upper cutting die adapted to cut exactly to a given pattern from which it is made can readily be manufactured at a comparatively small cost, especially when many different dies are being made at once. It will be noted that in this method emphasis is placed especially upon butt welding together the ends of the die material. Butt welding has many advantages over lap welding in the manufacture of these dies, since it permits the cutting edges of the die which have previously been bent to the outline of the pattern to be kept in alinement. It also effects a saving of material and a saving of time since there is not so much excess material to be removed after the welding operation. It will be noted further that in making dies by this method the fit of the die to the pattern or templet can be constantly watched and controlled and that therefore any deviation of the outline of the die from the outline of the pattern to be cut by it can be checked and corrected at any stage in its progress toward completion. A great advantage of this method is that it renders practicable the manufacture of dies by comparatively unskilled labor, whereas highly skilled and expensive labor has always been required heretofore in the manufacture of dies.

The term " grinding " used in the claims is intended to include any abrading operation by which material may be removed for the purposes indicated.

Having described my invention, what I claim as new and desire to secure by Letters Patent of the United States is:—

1. That improvement in the art of making dies which consists in providing a plurality of strips having an aggregate length greater than the length of the outline of the die to be made therefrom, making in succession a plurality of separated and distinct bends in one or more of said strips to form die sections, after each bending fitting the strips to pattern, and butt welding together the ends of said sections and at the same time forcing said ends together to reduce the die thus formed to pattern, during said butt welding operation maintaining in alinement the edges of the strips which are to form the cutting edges of the die.

2. That improvement in the art of making irregularly shaped dies which consists in dividing the outline of the pattern into sections in such manner as to decrease the difficulties of forming the curves and corners in the die, bending and fitting strips of die material, each of a length approximately the same as that of one of said sections, to conform each strip to its respective section of the outline of the pattern, and butt welding together the ends of said strips, in said butt welding operation maintaining in alinement the edges of the strips which are to form the cutting edge of the die.

3. That improvment in the art of making dies which consists in bending step by step one or more pieces of strip material having a substantially plane face transversely of said face and fitting the blank formed by said bending to a pattern to make the outline of one edge of said plane face conform to the outline of the pattern, and then butt welding the ends of said material, during the butt welding operation maintaining the edges of the plane faces on the adjacent ends of the material in substantial alinement.

4. That improvement in the art of making dies which consists in bending to the outline of the desired pattern to be cut by said die material somewhat longer than said outline and butt welding together the ends of said material and at the same time forcing said ends together to reduce the blank or die thus formed to the size of the pattern, and maintaining the cutting edges on the ends in alinement during the butt welding operation.

5. That improvement in the art of making stock-cutting dies which consists in shaping to different parts of the pattern strips of die material the aggregate length of which is somewhat greater than the length of the outline of the pattern, and then welding together the ends of the sections thus formed to make a die having the outline of the pattern, at the same time reducing the said die to the size of the pattern and during the welding operation maintaining in alinement the edges of the strips which are to form the cutting edge of the die.

6. That improvement in the art of making dies which consists in forming from strips of die material a plurality of die sections having an aggregate length somewhat greater than the outline of the desired pattern to be cut by the die, successively fitting the cutting edge of the sections to different portions of the pattern, and then butt welding together the said sections, maintaining the cutting edges on said sections in alinement during the butt welding operation, and at the same time reducing the cutting edge of the die thus formed to the size and shape of the pattern.

7. That improvement in the art of making dies which consists in forming from strips of material a plurality of differently shaped sections having an aggregate length somewhat greater than the outline of the desired pattern to be cut by the die, fitting said sections to the outline of an irregularly shaped pattern, and then butt welding together the ends of the said sections and at the same time forcing said ends together to reduce to the size of the pattern the blank or die thus formed, during said butt welding operation maintaining the cutting edges on the sections in alinement.

8. That improvement in the art of making dies which consists in bending to the outline of the desired pattern to be cut by said die material of a length somewhat greater than said outline, welding together the ends of said material and during the welding operation reducing the blank or die thus formed to the size of the pattern, and then pressing the upper and lower surfaces of said die into substantially parallel planes.

9. That improvement in the art of making dies which consists in bending strip die material to the outline of the pattern to be cut by said die, welding together the ends of said material and at the same time conforming the blank thus formed to pattern, heating the blank to remove the bending strains and then pressing the upper and lower faces into substantially parallel planes while the blank is hot.

10. That improvement in the art of making dies which consists in bending to the outline of the desired pattern to be cut by said die material of a length somewhat greater than said outline, welding together the ends of said material and at the same time reducing the die thus formed to pattern, pressing the upper and lower surfaces of said die into substantially parallel planes, and reducing the said surfaces to bring them exactly into parallel planes.

11. That improvement in the art of making dies which consists in bending strip material to the outline of the desired pattern to be cut by said die, welding together the ends of said material and at the same time conforming the die thus formed to the pattern, grinding one of the faces of said die to bring it into a plane and then grinding the other face of said die to bring it into a plane parallel to said first-mentioned plane and at a predetermined distance therefrom.

12. That improvement in the art of making dies which consists in heating and bending strip die material approximately to the shape of the pattern to be cut, welding together the ends of said material and at the same time conforming the die thus formed to pattern, pressing the upper and lower faces of said die into substantially parallel planes, reducing the cutting edge of the die to bring it into a plane and then reducing the opposite edge of said die to bring it into a plane parallel to the plane of the cutting edge and at the same time reduce the die to a predetermined height.

13. That improvement in the art of making dies which consists in bending to the outline of the desired pattern to be cut by the die material of a length somewhat greater than said outline, welding together the ends of said material and at the same time reducing the die thus formed to pattern, grinding the cutting edge of said die to bring it into one plane and then reducing said die and others similarly formed to uniform height at the same time bringing the upper edges of said dies into planes parallel to and equidistant from the planes of their cutting edges.

14. That improvement in the art of making dies which consists in bending to the outline of the desired pattern to be cut by said die material of a length somewhat greater than said outline, welding together the ends of said material and at the same time reducing the die thus formed to pattern, grinding one face of said die to bring said face within one plane, placing said die and others so formed with their plane faces upon a plane surface and then successively grinding the upper faces of said dies in such manner as to bring them into a plane parallel to that including the under faces and at a predetermined distance therefrom.

15. That improvement in the art of making dies which consists in bending to the outline of the desired pattern to be cut by said die material of a length somewhat greater than said outline and of a width somewhat greater than the desired height of the die to be formed, welding together the ends of said material and at the same time reducing the die thus formed to pattern and then reducing said die to the desired height.

16. That improvement in the art of making dies which consists in bending a strip of die material somewhat longer than the outline of the pattern to be cut approximately to the shape of said pattern, reducing the excess of material upon the two ends of the strip to predetermined and equal amounts, at the same time providing a clean contact surface and then electrically butt welding together the said ends and at the same time reducing the die thus formed to pattern.

17. That improvement in the art of making dies which consists in bending to the outline of the pattern to be cut by the die material having a length somewhat greater than said outline, welding together the ends of said material and at the same time reducing to pattern the die thus formed and then grinding the cutting edge of said die.

18. That improvement in the art of making dies which consists in bending to the outline of the desired pattern to be cut by said die material of a length somewhat greater than said outline, welding together the ends of said material and at the same time reducing the die thus formed to pattern, beveling the outer surface of said die toward the cutting edge and then filing upon said die at the lower end of said bevel a chisel cutting edge.

19. That improvement in the art of making dies which consists in bending to the outline of the desired pattern to be cut by said die material of a length somewhat greater than said outline, welding together the ends of said material and at the same time reducing to pattern the die thus formed, removing the burs formed by the excess material during the welding operation, and grinding the die to a cutting edge lying in its inner surface.

20. That improvement in the art of making dies provided with indicating nicks which consists in bending into substantially the outline of the desired pattern to be cut by said die material having a length somewhat greater than said outline, welding together the ends of said material and at the same time reducing the die thus formed to the size of the pattern, forming nicks in said die transverse to its cutting edge and then grinding said die upon its outside to form a sharp cutting edge.

21. That improvement in the art of making dies provided with indicating offsets in their cutting edges which consists in bending strip material into substantially the outline of the desired pattern to be cut by said die, welding together the ends of said material and at the same time conforming the die thus formed to the size of the pattern, bending in from the outside of the die the cutting edge offsets thereby leaving said outside edge free from protuberances and then grinding said die upon its outside to form a sharp cutting edge.

22. That improvement in the art of making dies provided with indicating offsets in their cutting edges which consists in bending into substantially the outline of the desired pattern to be cut by said die material having a length somewhat greater than said outline, welding together the ends of said material and at the same time reducing the die thus formed to the size of the pattern, grinding a portion of the outer surface of said die to reduce the cutting edge to a predetermined thickness, pressing in from said ground outer surface the abovementioned indicating offsets and then grinding said outer surface throughout its length to reduce said cutting edge to a predetermined and uniform thickness.

In testimony whereof I have signed my name to this specification in the presence of two subscribing witnesses.

JOHN M. LYNCH.

Witnesses:
H. DORSEY SPENCER,
EMILE H. TARDIVEL.

It is hereby certified that in Letters Patent No. 922,926, granted May 25, 1909, upon the application of John M. Lynch, of Beverly, Massachusetts, for an improvement in "Methods of Making Dies," errors appear in the printed specification requiring correction, as follows: In line 58, page 1, the word "shape" should read *shapes*; lines 104 and 105, page 2, the words "illustrating the preferred manner of practicing the method of this invention" should be stricken out and inserted after the word "drawings" in line 106, same page; line 10, page 4, after the word "dies" the word *being* should be inserted, and in line 54, same page, the word "heated" should read *painted*; and that the said Letters Patent should be read with these corrections therein that the same may conform to the record of the case in the Patent Office.

Signed and sealed this 15th day of June, A. D., 1909.

[SEAL.]

C. C. BILLINGS,
*Acting Commissioner of Patents.*